US012582853B2

(12) United States Patent
Carr et al.

(10) Patent No.: US 12,582,853 B2
(45) Date of Patent: Mar. 24, 2026

(54) FIRE ZONE THERMAL PROTECTION FOR ADJACENT COMPONENTS

(71) Applicant: Textron Innovations Inc., Providence, RI (US)

(72) Inventors: Timothy Carr, Fort Worth, TX (US); Douglas Durflinger, Fort Worth, TX (US); Ananya Manapure, Bangalore (IN); Girish Kaushal, Bangalore (IN)

(73) Assignee: Textron Innovations Inc., Providence, RI (US)

( * ) Notice: Subject to any disclaimer, the term of this patent is extended or adjusted under 35 U.S.C. 154(b) by 300 days.

(21) Appl. No.: 18/217,790

(22) Filed: Jul. 3, 2023

(65) Prior Publication Data

US 2025/0010111 A1 Jan. 9, 2025

(51) Int. Cl.
*A62C 2/06* (2006.01)

(52) U.S. Cl.
CPC ..................................... *A62C 2/06* (2013.01)

(58) Field of Classification Search
CPC ...... A62C 2/06; B64D 2045/009; B64C 1/403
See application file for complete search history.

(56) References Cited

U.S. PATENT DOCUMENTS 6,491,254 B1 * 12/2002 Walkinshaw .......... B64D 13/00 244/119
9,067,688 B2 * 6/2015 Bellabal ............... B64D 27/404
9,211,945 B2 * 12/2015 Redecker ................ B64C 1/067
9,868,545 B2 * 1/2018 Brochard .................. F02C 7/25
10,105,938 B2 * 10/2018 Guittard .................. B64C 1/064
11,396,366 B2 * 7/2022 Sanz Martinez ...... B64D 33/02
11,655,017 B2 * 5/2023 Vayssiere .............. B64C 27/006 244/119
11,820,485 B2 * 11/2023 Fink ........................ B64C 27/04
11,912,402 B2 * 2/2024 Vayssiere .................. B64C 1/40
12,258,121 B2 * 3/2025 Fink .......................... B64C 1/12
2013/0196136 A1 * 8/2013 Contzen .................. B32B 27/12 428/221
2014/0322479 A1 * 10/2014 Plaindoux ................. B64C 7/02 428/448
2015/0197341 A1 * 7/2015 Ewens ................ B64D 27/404 244/54
2015/0259074 A1 * 9/2015 Guillemaut ............ B64D 27/20 244/54
2017/0144743 A1 * 5/2017 Dickson .................... B64C 1/40
2018/0043983 A1 * 2/2018 Landais .................... B64C 1/40
2019/0048795 A1 * 2/2019 Parsons ...................... F01P 1/06
2021/0078693 A1 * 3/2021 Cromer ..................... B64C 1/12
(Continued)

*Primary Examiner* — Joseph A Greenlund
(74) *Attorney, Agent, or Firm* — FBT Gibbons LLP

(57) ABSTRACT

Embodiments include thermal covers to help drain fluids away from dangerous environments, e.g., in an engine bay in a vehicle. Thermal covers can comprise a hat portion extending between two distal edges, support straps beneath the hat portion and extending between the distal edges, and thermal insulation disposed between the hat portion and the support straps. These can be coupled to the floor so as to allow space below for the flow of fluid. This allows the fluid to flow to holes in the floor of the engine bay, allowing the fluid (which could be flammable) to be drained away from potentially dangerous environments in the engine bay which may involve high temperatures.

19 Claims, 12 Drawing Sheets

(56) References Cited

U.S. PATENT DOCUMENTS

| | | | | |
|---|---|---|---|---|
| 2023/0117007 | A1* | 4/2023 | Gourishankar | B32B 15/20<br>428/626 |
| 2023/0340895 | A1* | 10/2023 | Andrejczyk | B64C 27/04 |
| 2024/0367784 | A1* | 11/2024 | Fink | B64D 45/00 |
| 2025/0010111 | A1* | 1/2025 | Carr | A62C 2/06 |

* cited by examiner

FIRE ZONE THERMAL PROTECTION FOR ADJACENT COMPONENTS

TECHNICAL FIELD

The present disclosure is directed to vehicle design, and more particularly to fire zone protection for aircraft.

BACKGROUND OF THE INVENTION

Fires are one of many possible dangers in aircraft and other vehicles. Fire zones must be isolated by firewalls or shrouds from personnel compartments, structures, controls, rotor mechanisms, and other parts. In some applications, airframe structure or other heat sensitive parts may be adjacent to the fire zone. For example, in the event of heat flux from a fire transferring through a firewall, aluminum or composite will severely lose significant or all of its stiffness. Another concern is that composite parts could outgas harmful, or combustible vapors. If the insulation lies on the roof panel/engine deck, it will act as a fluid dam, preventing the proper drainage of flammable fluids, or requiring more drains to be added.

BRIEF SUMMARY OF THE INVENTION

One embodiment under the present disclosure comprises a thermal cover for protecting one or more components in an engine bay. The thermal cover comprises one or more hat portions configured to extend across one or more components on a surface in an engine bay and configured to be coupled to the surface along first and second distal edges; and one or more support straps configured to extend across the one or more components and between the first and second distal edges, the one or more support straps configured to sit between the one or more hat portions and the surfaces. The thermal cover further comprises one or more thermal insulation sheets configured to fit between the one or more support straps and the one or more hat portions; and one or more coupling mechanisms configured to couple the one or more hat portions to the surface along the first and second distal edges, the one or more coupling mechanisms configured to allow fluid flow along the surface under the thermal cover.

Another embodiment comprises a method of constructing an engine bay in a vehicle. The method comprises providing a floor and a plurality of walls, the floor comprising one or more holes configured to direct fluid away from the engine bay; and coupling one or more thermal covers to the floor along first and second distal edges of the one or more thermal covers so as to cover at least a portion of the floor. The one or more thermal covers comprises one or more hat portions configured to extend at least a portion of the floor and configured to be coupled to the floor along first and second distal edges; one or more support straps configured to extend across at least a portion of the floor and between the first and second distal edges, the one or more support straps configured to sit between the one or more hat portions and the surface; one or more thermal insulation sheets configured to fit between the one or more support straps and the one or more hat portions; and one or more coupling mechanisms configured to couple the one or more hat portions to the floor along the first and second distal edges, the one or more coupling mechanisms configured to allow fluid flow under the one or more thermal covers to the one or more holes.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Embodiments under the present disclosure include systems and methods for deploying thermal insulation within an aircraft or other vehicle to protect the aircraft/vehicle from an engine or APU (auxiliary power unit) fire, while simultaneously allowing a fluid path for flammable fluids to travel to drain locations. Advantages of the embodiments include protecting a structural load path by shielding parts from heat effects; use of non-metallic components by eliminating the risk of outgas or backside ignition; weight reduction (fewer drains); and allowing for use of composites adjacent to fire zone. Embodiments can utilize thermal blankets to block heat transfer to vulnerable structure adjacent to powerplants, while using risers to suspend the insulation blankets off the deck to allow drainage of corrosive, flammable, or noxious fluids.

Figure 1:
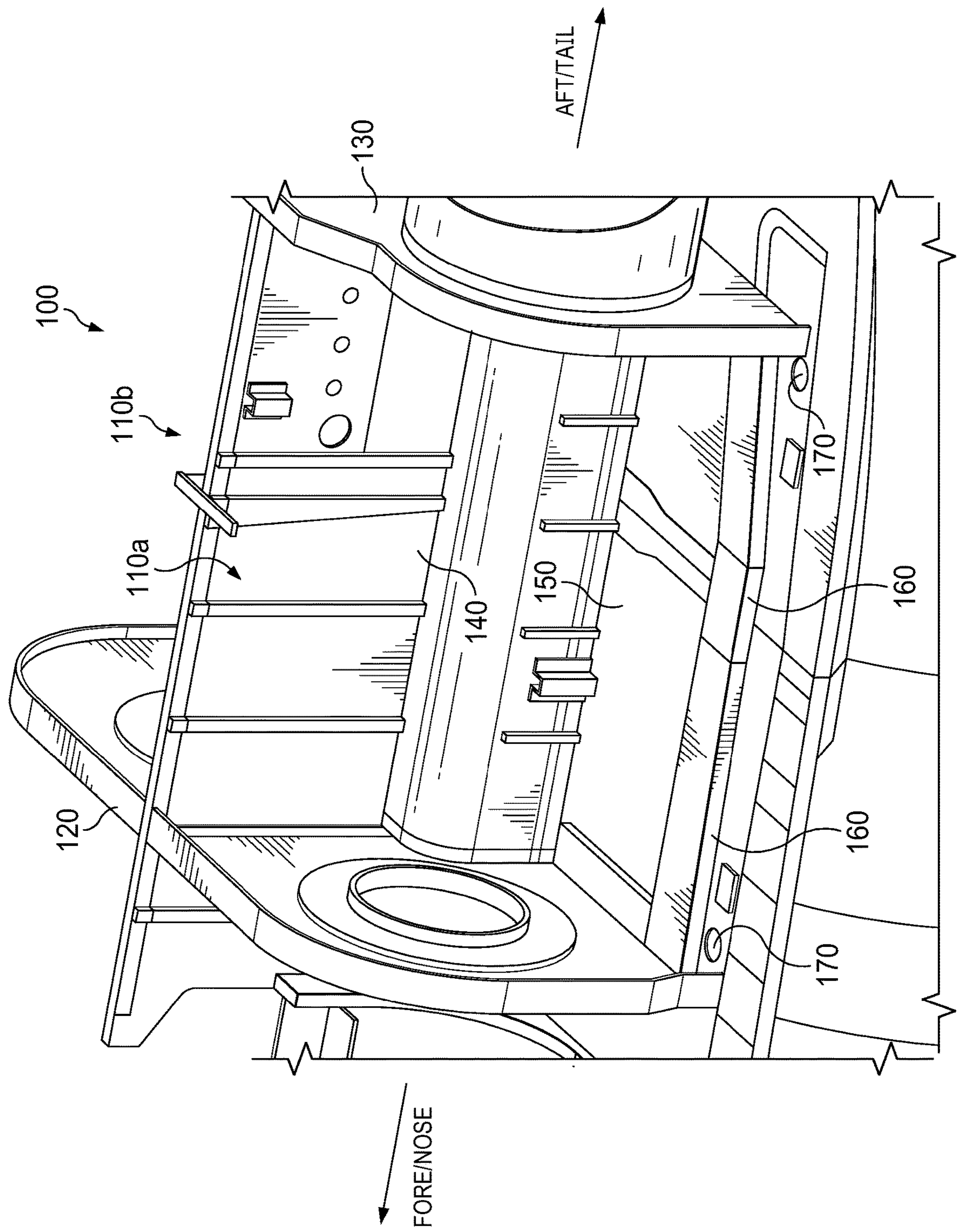
FIG. 1 displays an engine bay embodiment under the present disclosure.

FIG. 1 shows an engine bay or engine room 100 of an aircraft (though the present disclosure could be applied to engine rooms or other areas of other vehicles). Engine bay 100 is divided into two partitions 110*a/b*, which may each house an engine (not shown here). Other embodiments could comprise no partitions and just house one engine in the middle of an engine bay 100. Fore wall 120 and aft wall 130 divide engine bay 100 from others within an aircraft fuselage. Wall 140 divides partitions 110*a/b* from each other. Floor 150 provides a surface for an engine and other components to be coupled to, or stored within, the fuselage. A thermal cover 160 under the present disclosure covers a structural seam on floor 150. Drain holes 170 are preferably located in all four corners of engine bay 100 and allow fluids to drain out of engine bay 100 to a drain system or fluid collection system. Such drain or collected systems may direct certain fluids to the exterior of a vehicle, or to reservoirs. Engine bay 100 should be insulated in some way to prevent high temperatures or fires from harming components in other parts of the vehicle, to provide customer safety, and more. While walls 120, 130, 140 may be insulated, it would be harmful to merely put insulation on floor 150. Laying insulation on floor 150 could create a fluid dam, preventing the proper drainage of flammable, corrosive, or noxious fluids, or require numerous additional drains. Embodiments of thermal cover 160 can provide solutions to these and other challenges.

Figure 2:
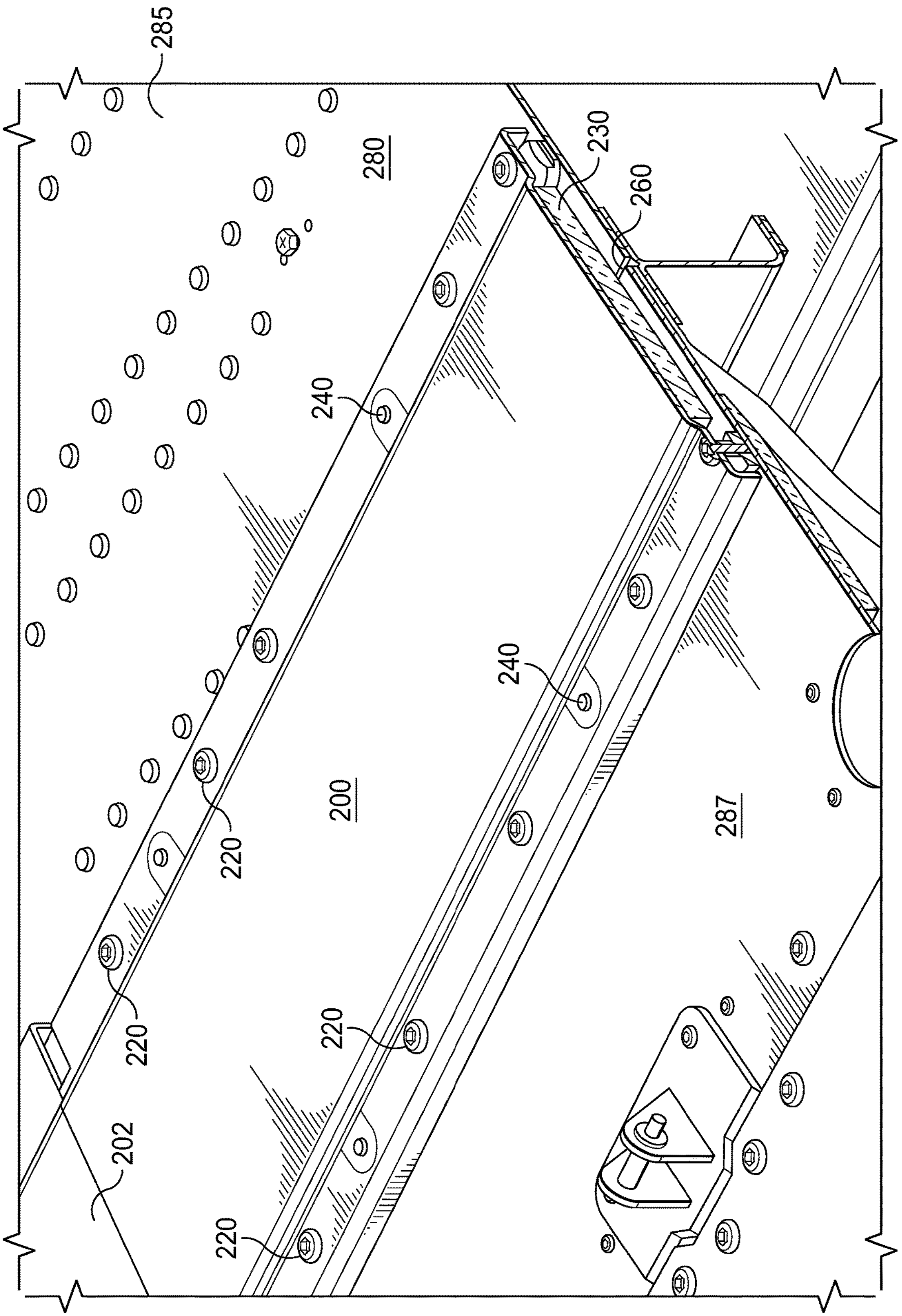
FIG. 2 displays a thermal cover embodiment under the present disclosure.

FIG. 2 shows an enhanced view of thermal cover 160 of FIG. 1. Here, thermal cover 200 can be seen to extend across two sides of seam 260 which, in part, joins portions 285, 287 of floor 280. A second thermal cover 202 extending further down seam 260. The second thermal cover 202 may be used because seam 260 changes directions, or the geometry or layout of an engine or engine bay may limit the length of thermal cover 200. Bolts 220 couple thermal cover 200 to portions 285, 287 of floor 280 along distal edges of thermal cover 200. Connectors 240 connect hat and support strap portions (discussed further below) of the thermal cover 200 together. Thermal insulation 230 can be seen underneath the hat portion of thermal cover 200.

Figure 3:
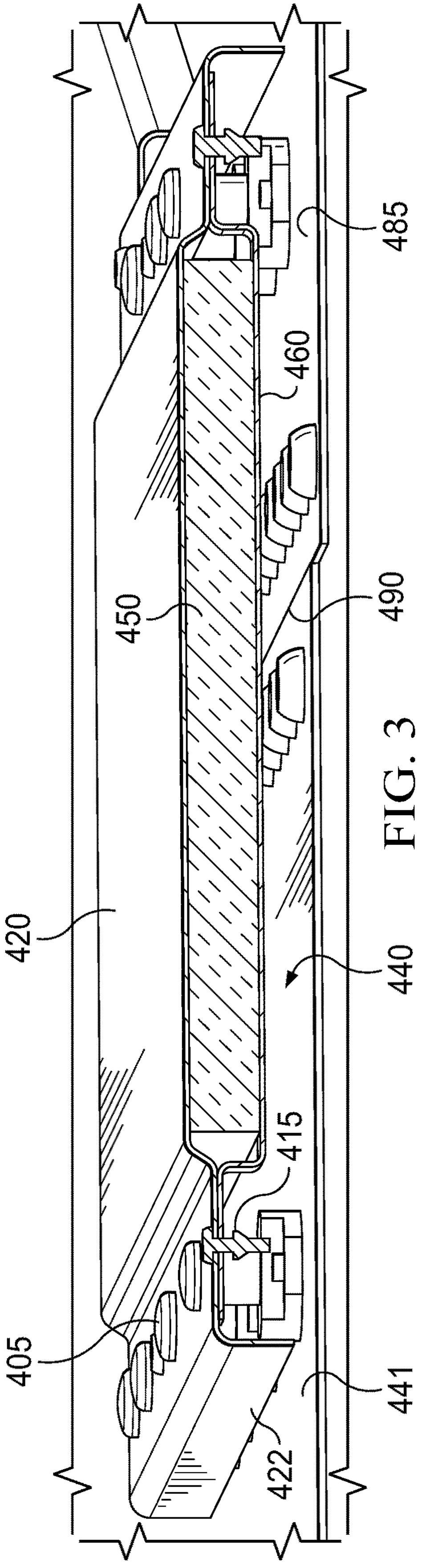
FIG. 3 displays a thermal cover embodiment under the present disclosure.

FIG. 3 shows a cross section view of cover 200 of FIG. 2 and cover 160 of FIG. 1. As seen hat 420 extends across seem 490 in floor 485 and preferably extends longitudinally across multiple sets of bolts 405 or connectors 415. Support straps 460 extend between sets of connectors 415 or sets of bolts 405 and are operable, with hat 420, to hold in place thermal insulation 450. Generally, it is preferred that hat 420 extend along an entire seem 490 or a substantial portion thereof, though this may not always be feasible due to geometry or structural limitations within an aircraft. In some embodiments multiple hats 420 can be used along the length of a seem 490. In contrast, multiple support straps 460 will be used with a single hat 420, somewhat resembling a ladder underneath thermal insulation 450. This will save weight. Hat 420 is coupled to floor 485 with bolts 405, and extends upward, creating space for thermal insulation 450. Support straps 460 can be coupled to hat 420 with either connectors 415 or bolts 405, and extend downward, creating space for thermal insulation 450. Support straps 460 do not touch floor 485, thereby creating a gap 440. This gap 440 allows for the drainage of any fluids, such as corrosive, flammable, or noxious fluids, including gasoline, oil, lubricants or others, that may condense, form, leak or otherwise collect in the engine bay or room. Hat 420 may comprise an overhang portion 422, which preferably does not touch floor 485 and has a small gap 441 allowing for fluid to flow underneath. Gaps 440, 441 preferably measure approximately 0.10 inches. But embodiments can comprise larger or smaller gaps.

Thermal insulation 450 can take a variety of forms. Preferred embodiments can utilize silicon or ceramic insultation blankets, which can have a desirable combination of insulation properties and low weight. Other composites can be used however, such as those stitched with fiberglass. A variety of other insulation materials can be used. The placement of thermal insulation 450 helps prevent an engine or APU (auxiliary power unit) fire from impacting important structural elements, such as seem 490 and the structural elements underneath it. Gap 440 and gap 441 allow for the drainage of undesirable materials away from the engine bay and any possible fire or thermal event.

Figure 4:
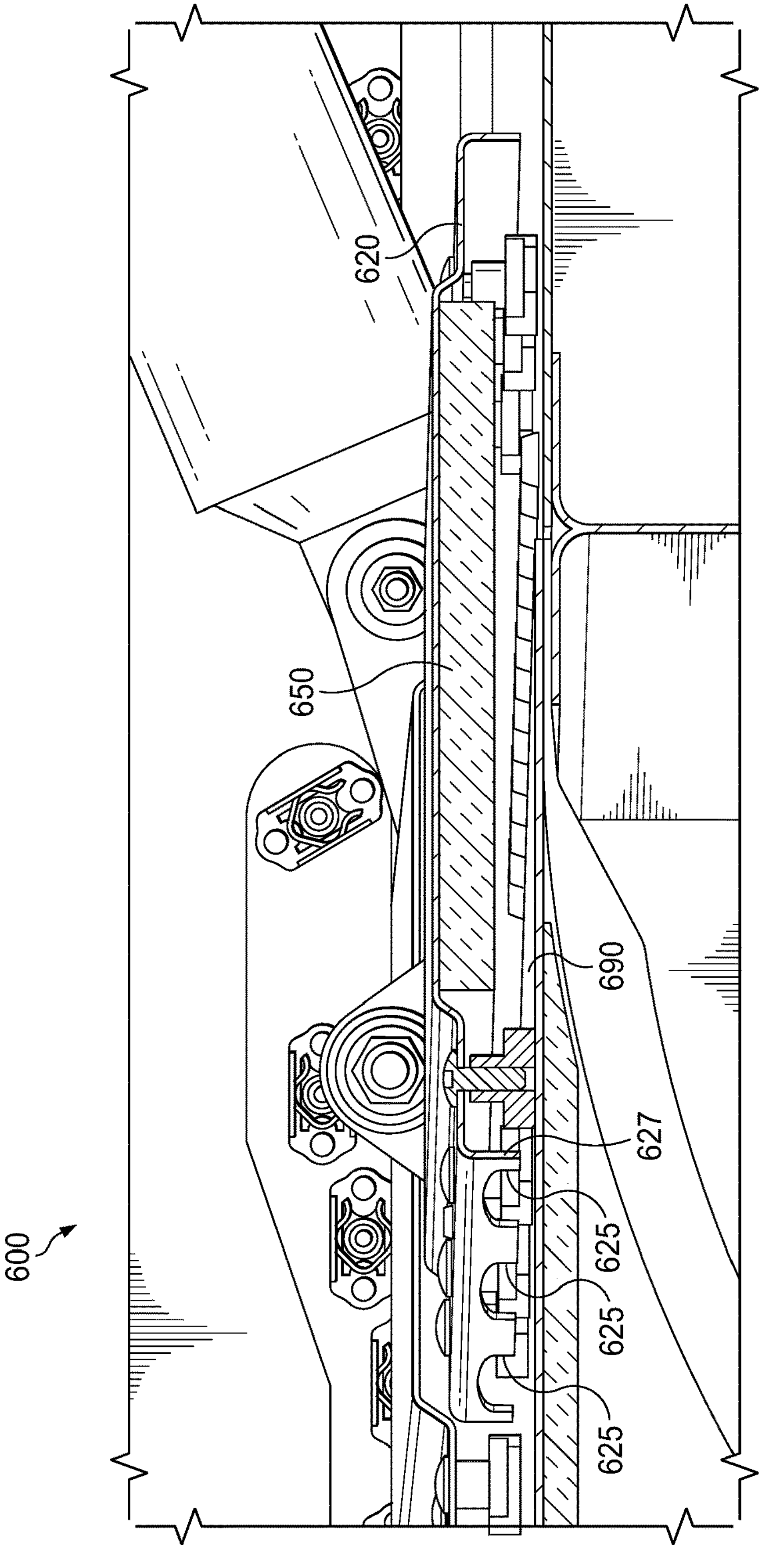
FIG. 4 displays a thermal cover embodiment under the present disclosure.

FIG. 4 shows another possible embodiment of a thermal cover 600. Hat 620 extends between plurality of bolts 640 and restrains, from the top, thermal insulation 650. Overhang portion 627 of hat 620 extends past bolts 640 and extends toward floor 690. In this embodiment overhang portion 627 extends all the way to floor 690 (no gap as was shown in FIG. 3). Mouse holes 625 provide paths for fluid to flow through. While there is no gap, the embodiment of FIG. 4 still allows for fluids to flow away from the possibly dangerous environment near the engines.

Figure 5:
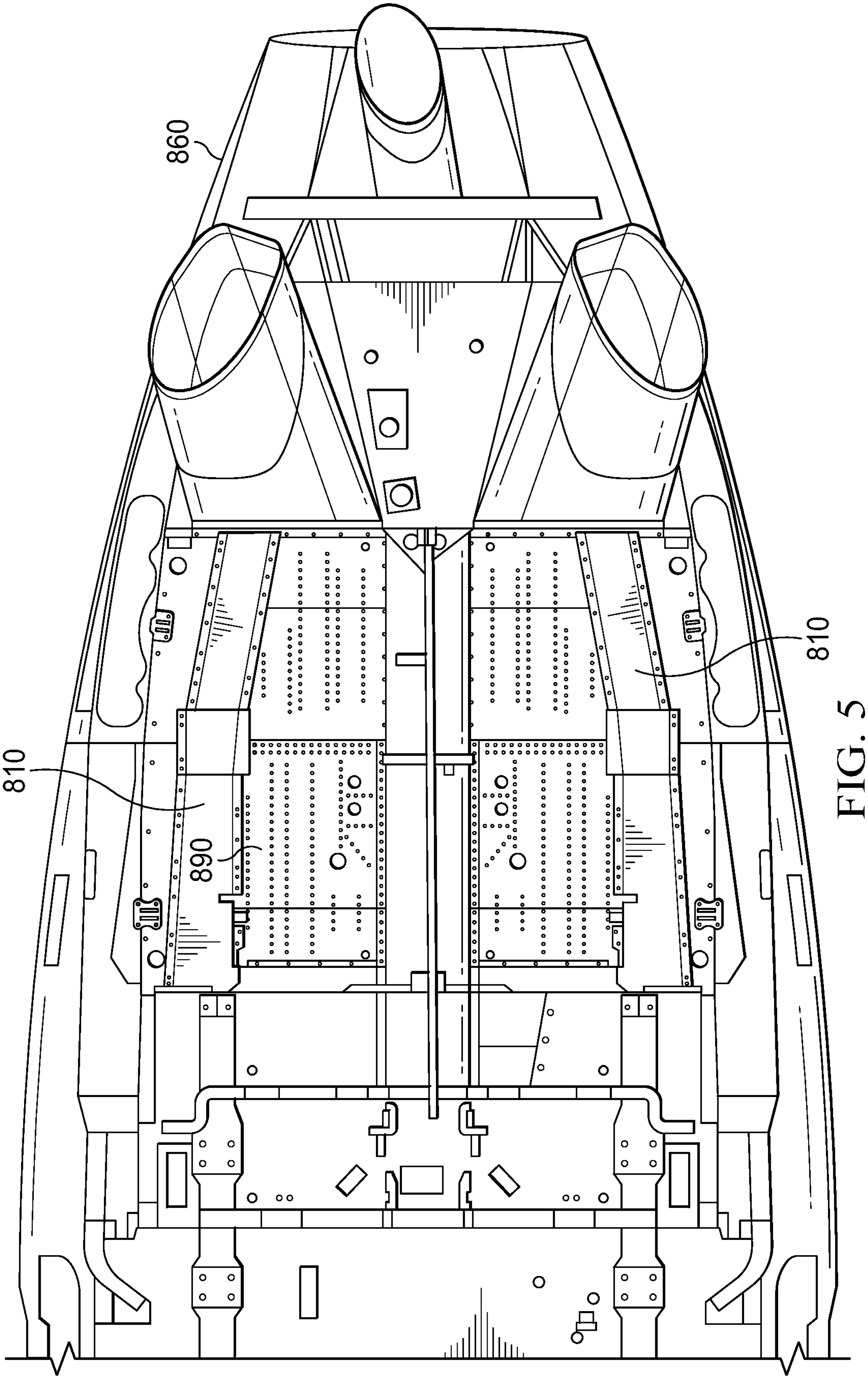
FIG. 5 displays an engine bay embodiment under the present disclosure.

FIG. 5 shows an embodiment of thermal covers 810 in a cut away view within an aircraft fuselage 860. When operational, the fuselage 860 would also contain one or more engines that might, at least partially, obstruct the view of thermal covers 810 from this viewpoint. The specific layout of thermal covers 810 could take a variety of forms. In this embodiment, each thermal cover 810 covers a, roughly, linear seem in floor 890. But in other embodiments, the layout of thermal covers 810 could take a circular form, an 'X', a series of stripes, a series of squares, or any appropriate arrangement of shapes that may be used to protect at-risk structural components or other parts of a vehicle or aircraft.

Figure 6:
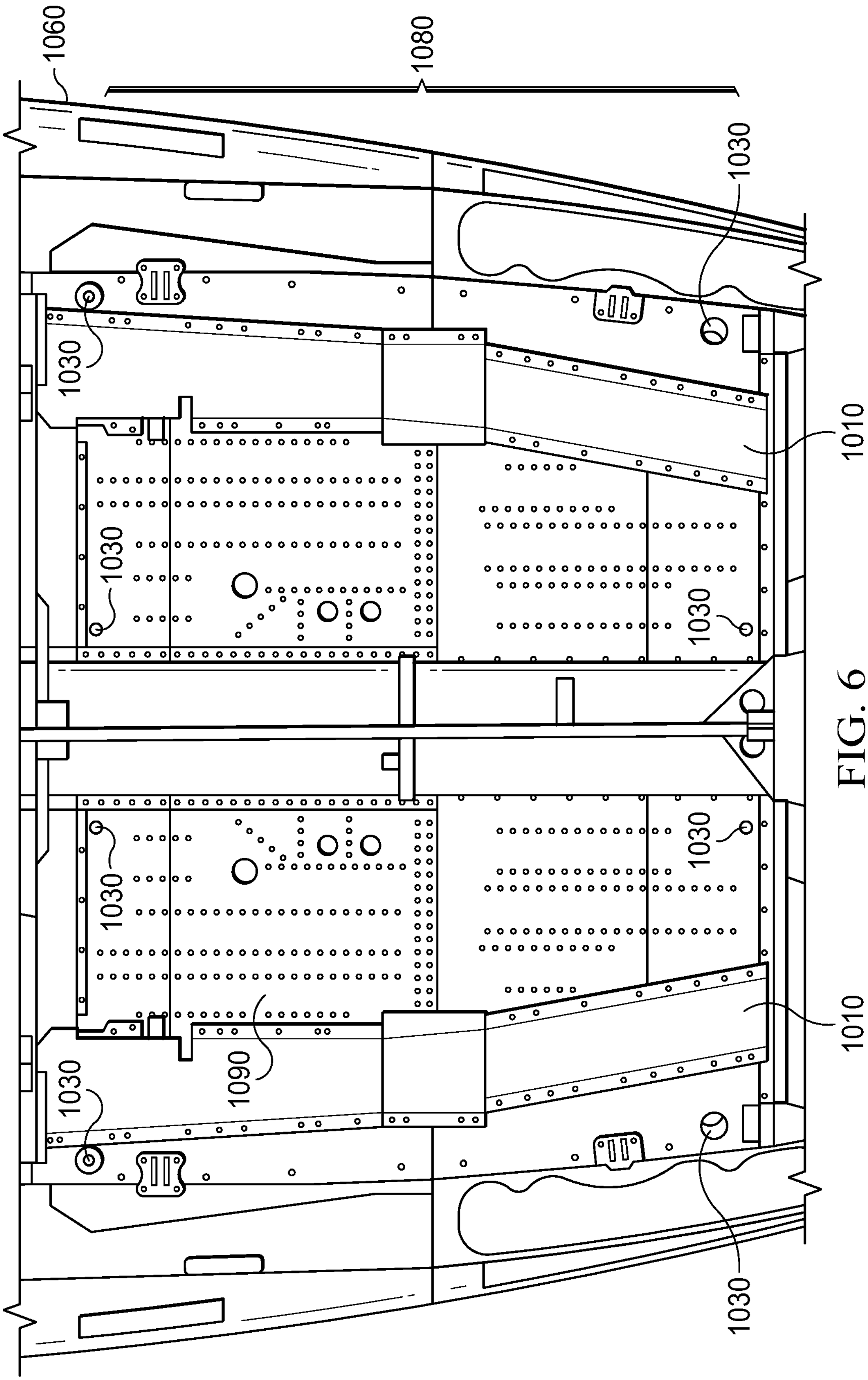
FIG. 6 displays an engine bay embodiment under the present disclosure.

FIG. 6 shows an alternative embodiment of fuselage 1060 with thermal covers 1010. Drain holes 1030 can be incorporated within floor 1090 within engine bay 1080. Drain holes 1030 help drain away fluids from the potentially dangerous heat or fumes within engine bay 1080.

Figure 7:
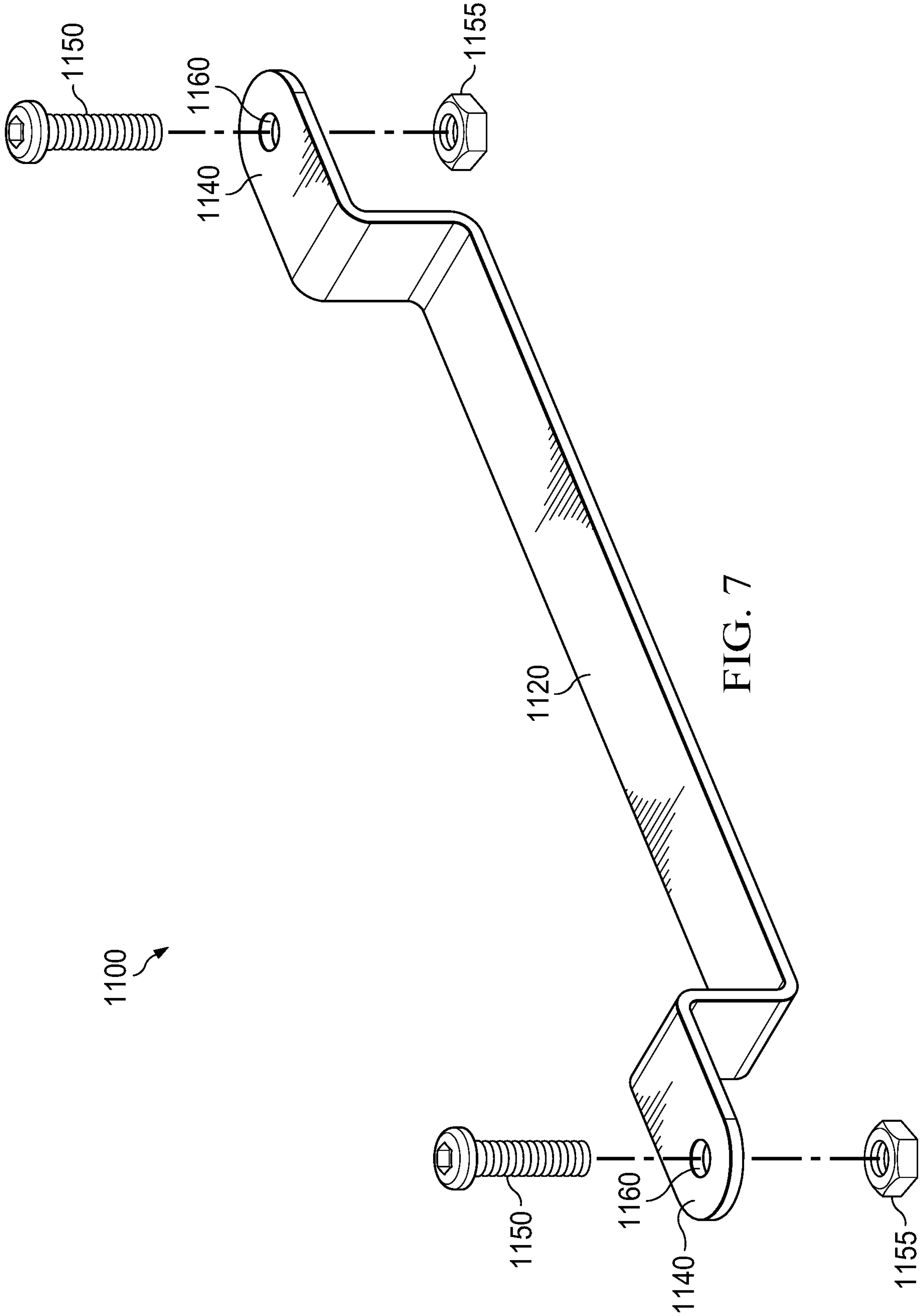
FIG. 7 displays a support strap embodiment under the present disclosure.

FIG. 7 shows a possible embodiment of support straps 460 from FIG. 3. In FIG. 7, support strap 1100 is shown in isolation so as to show its general shape and functionality. Connectors 1150 can be used to couple support strap 1100 to a floor of an engine bay, or other attachment components. Middle portion 1120 is generally planar and is configured to restrain a slab of thermal insulation from the bottom (with a hat portion of a thermal cover configured to restrain from the top). End portions 1140 extend upward from the plane of middle portion 1120 and comprise holes 1160 that can receive connectors 1150. Connectors 1150 are shown in FIG. 7 as a bolt and nut 1155, but other mechanisms could be used. Connectors 1150 could comprise a variety of coupling mechanisms: bolt and nut; push through connector; screw; and others. Alternatively, welding, sauntering, or similar means could be used.

Figure 8:
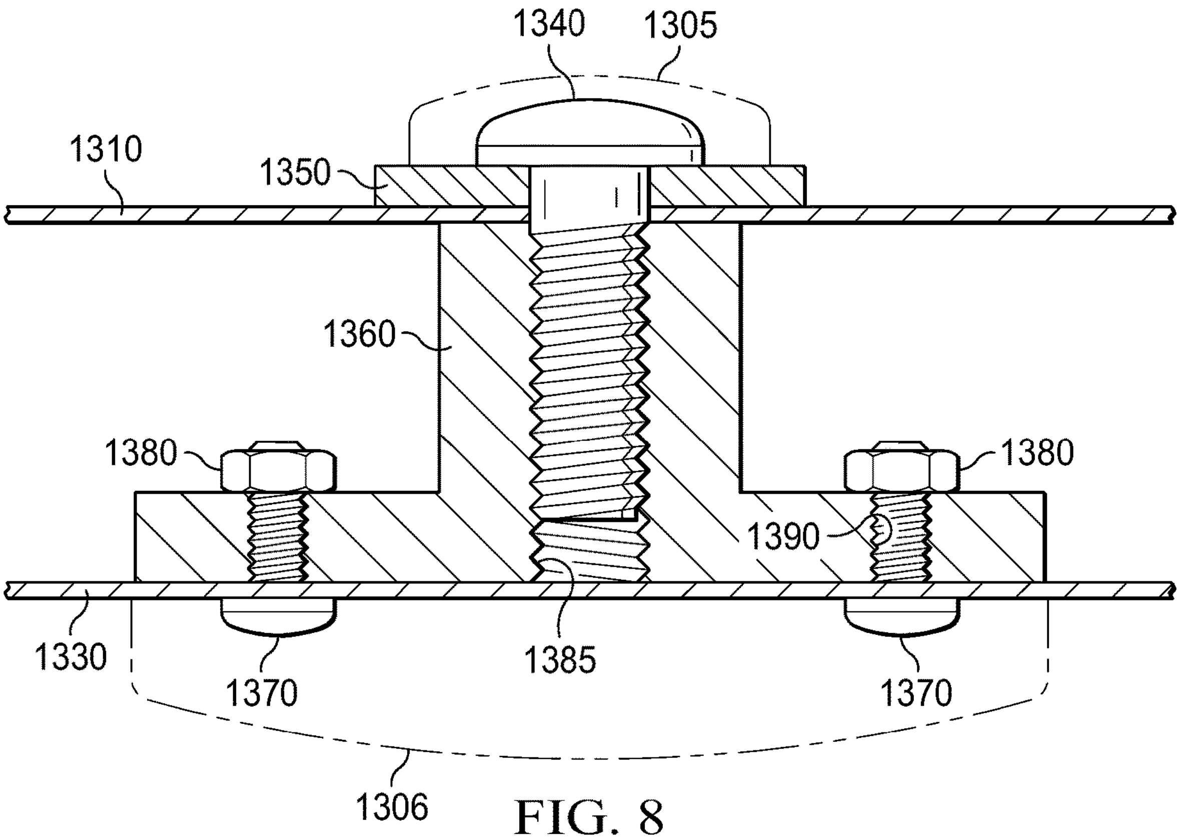
FIG. 8 displays a coupling mechanism embodiment under the present disclosure.
Figure 9:
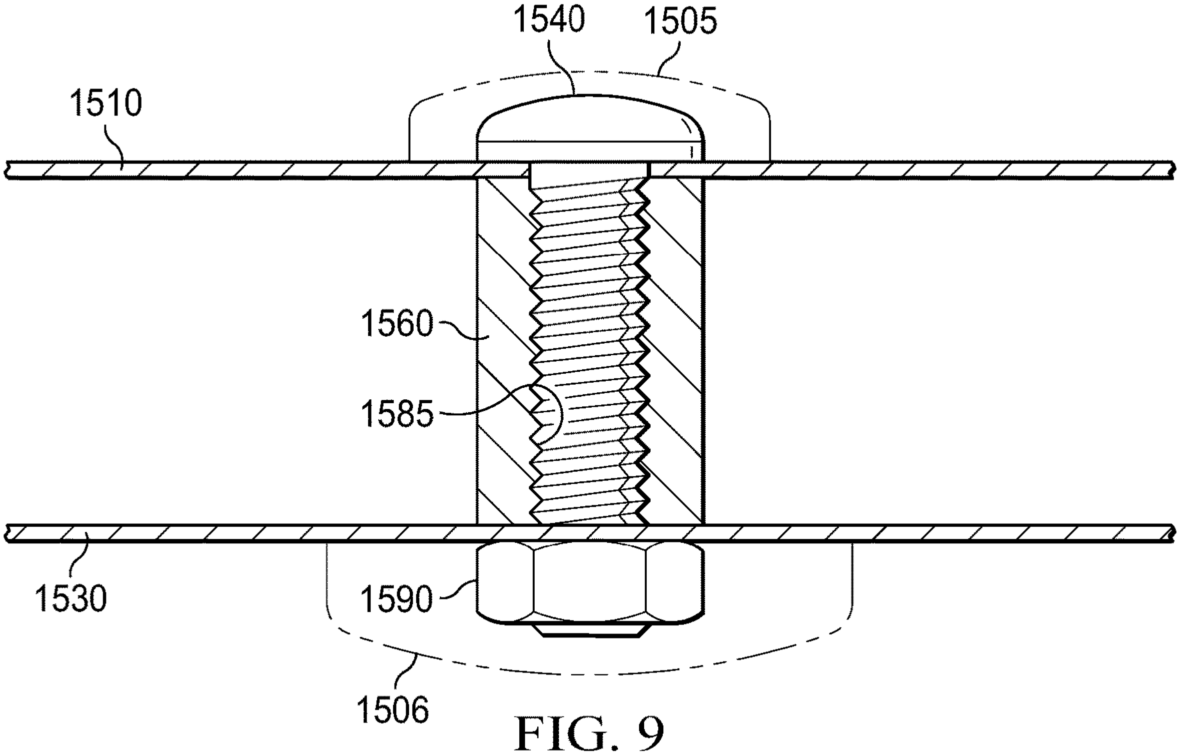
FIG. 9 displays a coupling mechanism embodiment under the present disclosure.

As described in reference to FIG. 3, hat 420 is preferably connected to floor 485 with a plurality of bolts 405. Support straps 460 are preferably disposed at intervals on the under-side of hat 420 with connectors 415 or bolts 405. In a preferred embodiment, support straps 460 are coupled to hat 420 with connectors 415 independent of the bolts 405 that couple hat 420 to floor 485. But in some embodiments bolts 405 could both connect hat 420 to floor 485 and to support straps 460. FIGS. 8-9 show several embodiments of bolts 405 and coupling mechanisms to couple hat 420 to a floor 485.

In FIG. 8 hat 1310 is coupled to floor 1330. Threaded bolt 1340 is inserted through a hole in hat 1310 and into a threaded recess 1385 inside of spacer 1360. Spacer 1360 can be sized to achieve the desirable height of hat 1310 off of floor 1330 (and thereby the desired vertical placement of thermal insulation and any desired gaps between overhang portions of hat 1310 to the floor 1330). Washer 1350 can be placed between bolt 1340 and hat 1310. Bolts 1370 can extend through holes in floor 1330 and through threaded holes 1390 in lateral edges (or flanges) 1362 of spacer 1360 and engage nuts 1380. Alternatively holes 1390 might not be threaded and only nuts 1380 are coupled. In some embodiments a support strap could also be coupled between bolt 1340 and spacer 1360, below the hat 1310 and washer 1350. In some embodiments bolt 1340 could extend through a hole in floor 1330 and engage a nut, washer, or other coupling means.

FIG. 9 shows a hat 1510 coupled to a floor 1530. Bolt 1540 extends through a hole in hat 1510, through a threaded hole 1585 in spacer 1560, and through a hole in floor 1530. Hole 1585 could alternatively be unthreaded. Spacer 1560 can be sized to achieve the desirable height of hat 1510 off of floor 1530 (and thereby the desired vertical placement of thermal insulation and any desired gaps between overhang portions of hat 1510 to the floor 1530).

Welding, sauntering, adhesives, and other similar coupling means can also be used to join any of the components shown in FIGS. 8 and 9. Firewall sealant 1305, 1306, 1505, 1506 can also be used (e.g., "wet installed") at various locations of FIG. 8 or 9 to protect any holes, bolts, or other components. Various arrangements of bolts, screws, washers, spacers, rivets, welding, and other coupling mechanisms and means can be used to couple hat portions and support straps to each other and to a floor in an engine bay or other area in a vehicle. FIGS. 7-9 give several examples, but other arrangements are possible.

Figure 10:
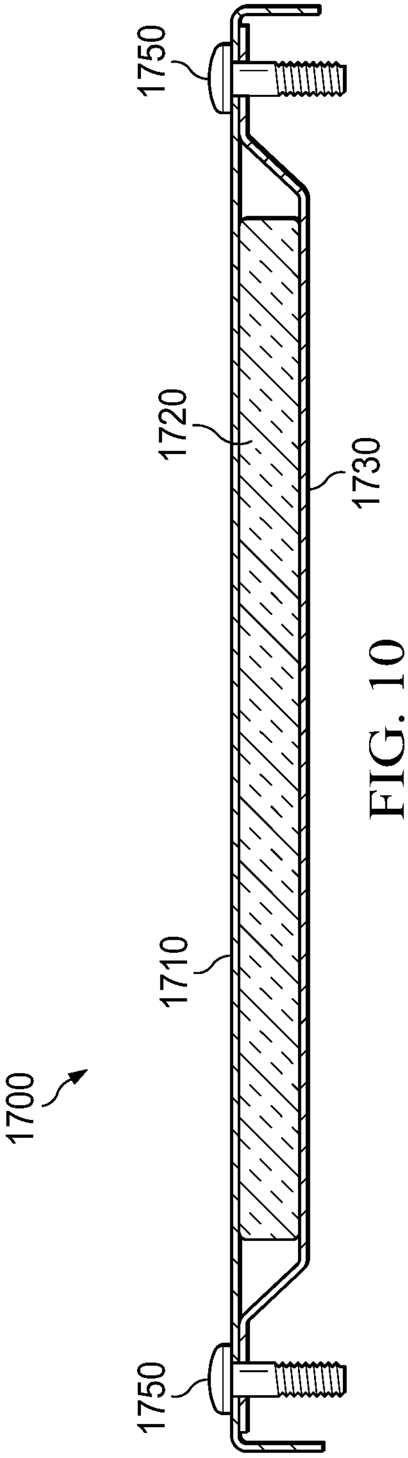
FIG. 10 displays a thermal cover embodiment under the present disclosure.
Figure 11:
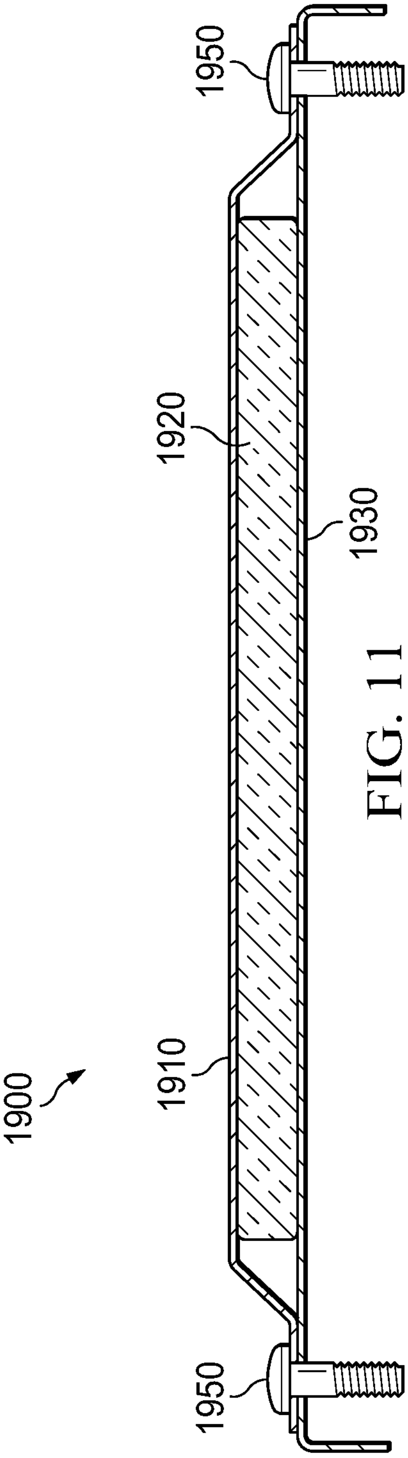
FIG. 11 displays a thermal cover embodiment under the present disclosure.

The exact geometry of a thermal cover, such as shown in FIGS. 1-4, can vary while still embodying aspects of the present disclosure. FIGS. 10 and 11 show several different possible embodiments of thermal covers under the present disclosure. In FIG. 10, thermal cover 1700 comprises an almost entirely flat hat portion 1710. Here, support strap 1730 extends downward from coupling mechanism 1750 and thermal insulation 1720 is placed between support strap 1730 and hat portion 1710. In FIG. 11, support strap 1930 is horizontal, while hat portion 1910 extends upward from coupling mechanism 1950. Thermal insulation 1720 is placed between hat portion 1910 and support straps 1930. The exact shape and layout of hat portions and support straps can take a variety of forms.

Figure 12:
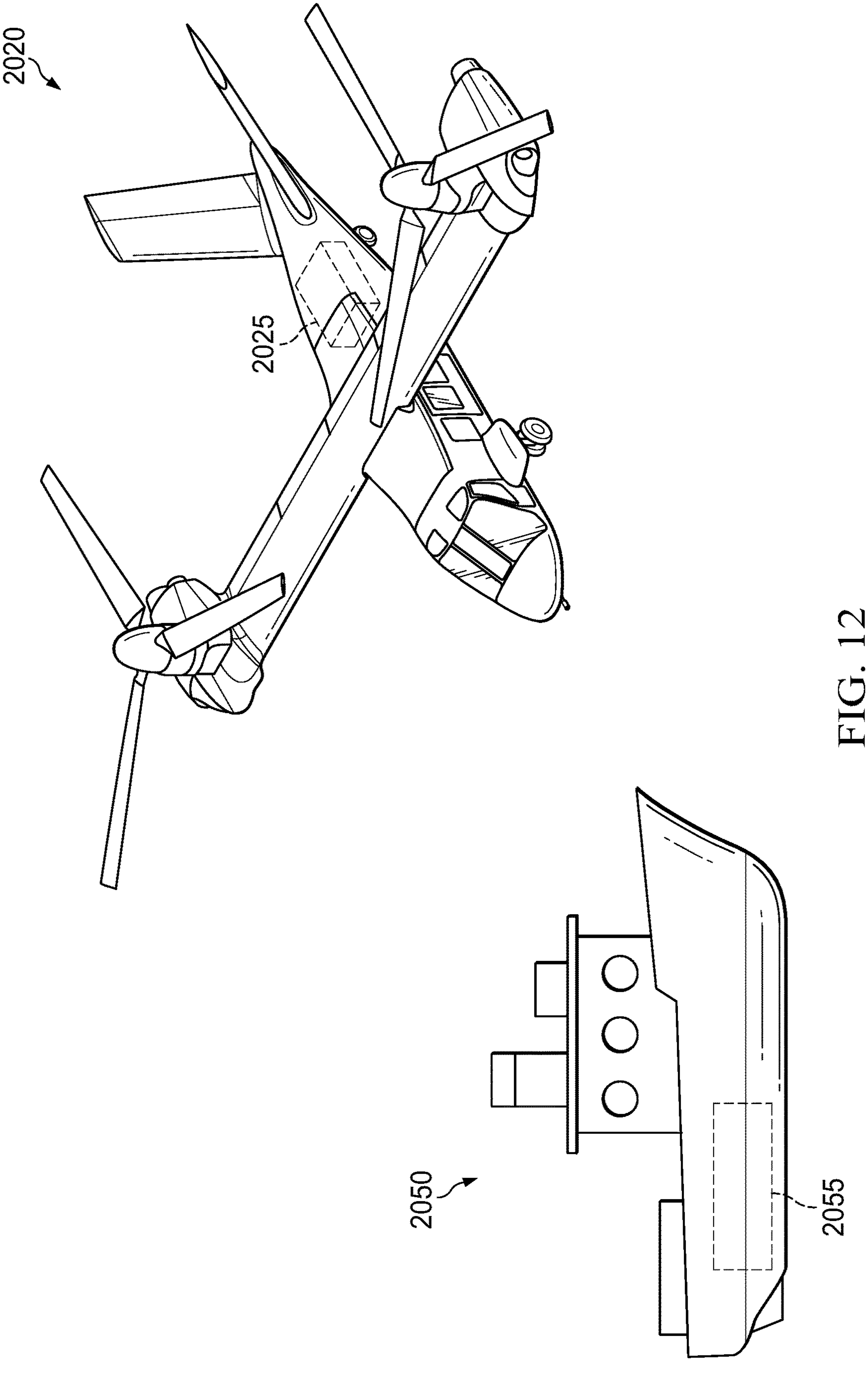
FIG. 12 displays possible vehicle embodiments under the present disclosure.

FIG. 12 displays possible vehicles comprising an engine bay, such as engine bay 100 of FIG. 1. Aircraft 2020 can comprise an engine bay 2025. Boat 2050 can comprise an engine bay 2055. Embodiments of the present disclosure can be implemented in a variety of vehicles.

Figure 13:
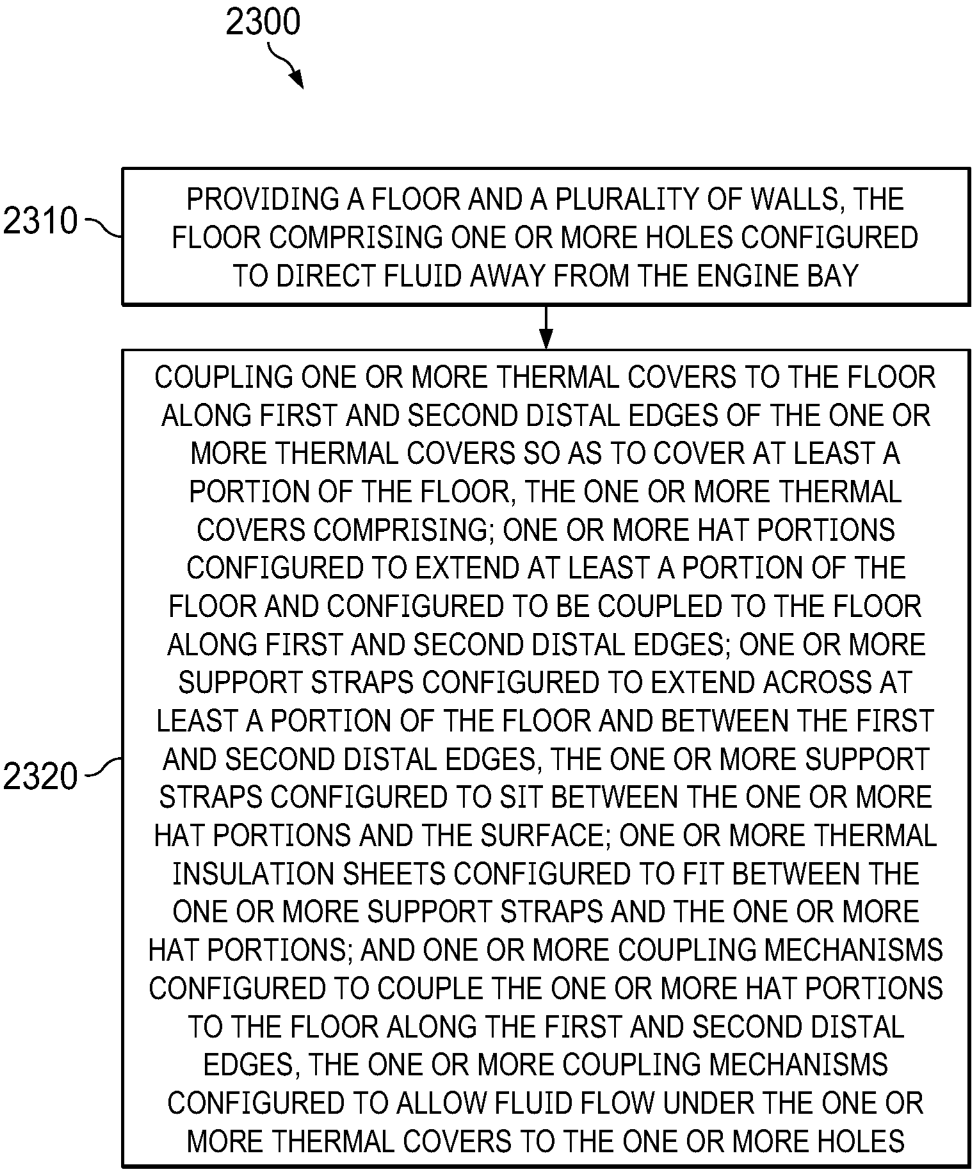
FIG. 13 is a flow chart of a method embodiment under the present disclosure.

FIG. 13 displays a flow chart of a possible method embodiment under the present disclosure. Method 2300 is a method of constructing an engine bay in a vehicle. Step 2310 is providing a floor and a plurality of walls, the floor comprising one or more holes configured to direct fluid away from the engine bay. Step 2320 is coupling one or more thermal covers to the floor along first and second distal edges of the one or more thermal covers so as to cover at least a portion of the floor. The one or more thermal covers can comprise any thermal cover embodiment described herein, such as one comprising one or more hat portions configured to extend at least a portion of the floor and configured to be coupled to the floor along first and second distal edges; one or more support straps configured to extend across at least a portion of the floor and between the first and second distal edges, the one or more support straps configured to sit between the one or more hat portions and the surface; one or more thermal insulation sheets configured to fit between the one or more support straps and the one or more hat portions; and one or more coupling mechanisms configured to couple the one or more hat portions to the floor along the first and second distal edges, the one or more coupling mechanisms configured to allow fluid flow under the one or more thermal covers to the one or more holes.

Method 2300 can comprise a variety of additional or alternative steps or components. For example, in some variations, the one or more thermal covers can comprise one or more overhang portions at the first and second distal edges, the one or more overhang portions configured to extend toward the floor and to leave a gap between the one or more overhang portions and the floor to allow for fluid flow. In some embodiments, the one or more thermal covers can comprise one or more overhang portions at the first and second distal edges, the one or more overhang portions configured to extend toward and engage the floor, the one or more overhang portions comprising one or more mouse holes to allow for fluid flow. In some variations the vehicle comprises an aircraft, in others it's a boat. In some embodiments, providing a floor can comprise joining two or more structural components along a seam, wherein the one or more thermal covers are configured to extend across the seam. In another example embodiment, at least one of the one or more thermal covers can comprise a hole configured to receive one or more components therethrough.

Abbreviated List of Defined Terms

To assist in understanding the scope and content of this written description and the appended claims, a select few terms are defined directly below. Unless defined otherwise, all technical and scientific terms used herein have the same meaning as commonly understood by one of ordinary skill in the art to which the present disclosure pertains.

The terms "approximately," "about," and "substantially," as used herein, represent an amount or condition close to the specific stated amount or condition that still performs a desired function or achieves a desired result. For example, the terms "approximately," "about," and "substantially" may refer to an amount or condition that deviates by less than 10%, or by less than 5%, or by less than 1%, or by less than 0.1%, or by less than 0.01% from a specifically stated amount or condition.

Various aspects of the present disclosure, including devices, systems, and methods may be illustrated with reference to one or more embodiments or implementations, which are exemplary in nature. As used herein, the term "exemplary" means "serving as an example, instance, or illustration," and should not necessarily be construed as preferred or advantageous over other embodiments disclosed herein. In addition, reference to an "implementation" of the present disclosure or invention includes a specific reference to one or more embodiments thereof, and vice versa, and is intended to provide illustrative examples without limiting the scope of the invention, which is indicated by the appended claims rather than by the following description.

As used in the specification, a word appearing in the singular encompasses its plural counterpart, and a word appearing in the plural encompasses its singular counterpart, unless implicitly or explicitly understood or stated otherwise. Thus, it will be noted that, as used in this specification and the appended claims, the singular forms "a," "an" and "the" include plural referents unless the context clearly dictates otherwise. For example, reference to a singular referent (e.g., "a widget") includes one, two, or more referents unless implicitly or explicitly understood or stated otherwise. Similarly, reference to a plurality of referents should be interpreted as comprising a single referent and/or a plurality of referents unless the content and/or context clearly dictate otherwise. For example, reference to referents in the plural form (e.g., "widgets") does not necessarily require a plurality of such referents. Instead, it will be appreciated that independent of the inferred number of referents, one or more referents are contemplated herein unless stated otherwise.

As used herein, directional terms, such as "top," "bottom," "left," "right," "up," "down," "upper," "lower," "proximal," "distal," "adjacent," and the like are used herein solely to indicate relative directions and are not otherwise intended to limit the scope of the disclosure and/or claimed invention

CONCLUSION

It is understood that for any given component or embodiment described herein, any of the possible candidates or alternatives listed for that component may generally be used individually or in combination with one another, unless implicitly or explicitly understood or stated otherwise. Additionally, it will be understood that any list of such candidates or alternatives is merely illustrative, not limiting, unless implicitly or explicitly understood or stated otherwise.

In addition, unless otherwise indicated, numbers expressing quantities, constituents, distances, or other measurements used in the specification and claims are to be understood as being modified by the term "about," as that term is defined herein. Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

Any headings and subheadings used herein are for organizational purposes only and are not meant to be used to limit the scope of the description or the claims.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention itemed. Thus, it should be understood that although the present invention has been specifically disclosed in part by preferred embodiments, exemplary embodiments, and optional features, modification and variation of the concepts herein disclosed may be resorted to by those skilled in the art, and such modifications and variations are considered to be within the scope of this invention as defined by the appended items. The specific embodiments provided herein are examples of useful embodiments of the present invention and various alterations and/or modifications of the inventive features illustrated herein, and additional applications of the principles illustrated herein that would occur to one skilled in the relevant art and having possession of this disclosure, can be made to the illustrated embodiments without departing from the spirit and scope of the invention as defined by the items and are to be considered within the scope of this disclosure.

It will also be appreciated that systems, devices, products, kits, methods, and/or processes, according to certain embodiments of the present disclosure may include, incorporate, or otherwise comprise properties or features (e.g., components, members, elements, parts, and/or portions) described in other embodiments disclosed and/or described herein. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

All references cited in this application are hereby incorporated in their entireties by reference to the extent that they are not inconsistent with the disclosure in this application. It will be apparent to one of ordinary skill in the art that methods, devices, device elements, materials, procedures, and techniques other than those specifically described herein can be applied to the practice of the invention as broadly disclosed herein without resort to undue experimentation. All art-known functional equivalents of methods, devices, device elements, materials, procedures, and techniques specifically described herein are intended to be encompassed by this invention.

When a group of materials, compositions, components, or compounds is disclosed herein, it is understood that all individual members of those groups and all subgroups thereof are disclosed separately. When a Markush group or other grouping is used herein, all individual members of the group and all combinations and sub-combinations possible of the group are intended to be individually included in the disclosure. Every formulation or combination of components described or exemplified herein can be used to practice the invention, unless otherwise stated. Whenever a range is given in the specification, for example, a temperature range, a time range, or a composition range, all intermediate ranges and subranges, as well as all individual values included in the ranges given are intended to be included in the disclosure. All changes which come within the meaning and range of equivalency of the items are to be embraced within their scope.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A thermal cover for protecting one or more components in an engine bay, the thermal cover comprising:

one or more hat portions configured to extend across one or more components on a surface in an engine bay and configured to be coupled to the surface along first and second distal edges;

one or more support straps configured to extend across the one or more components and between the first and second distal edges, the one or more support straps configured to sit between the one or more hat portions and the surface and to be spaced apart from the surface forming a fluid drainage gap;

one or more thermal insulation sheets configured to fit between the one or more support straps and the one or more hat portions; and one or more coupling assemblies comprising a threaded bolt extending through a hole in a hat portion of the one or more hat portions and a spacer configured to maintain a clearance between the hat portion and the surface, thereby preserving the fluid drainage gap, and the surface and to receive the threaded bolt, the one or more coupling assemblies configured to couple the one or more hat portions to the surface along the first and second distal edges, the one or more coupling assemblies configured to allow fluid flow along the surface under the thermal cover.

2. The thermal cover of claim 1, wherein the one or more coupling mechanisms are further configured to couple the one or more support straps to the one or more hat portions.

3. The thermal cover of claim 1, further comprising a second one or more coupling mechanisms configured to couple the one or more support straps to the one or more hat portions.

4. The thermal cover of claim 1, wherein the one or more hat portions comprise an overhang portion at the first and second distal edges and outside of the one or more coupling mechanisms that extends toward the surface.

5. The thermal cover of claim 4, wherein the overhang portion comprises one or more mouse holes configured to permit the flow of fluid therethrough.

6. The thermal cover of claim 1, wherein the spacer comprises a lateral extension configured to be coupled to the surface with one or more bolts.

7. The thermal cover of claim 1, wherein the threaded bolt is further configured to extend through a hole in the surface and engage a threaded nut on a distal side of the surface.

8. The thermal cover of claim 1, wherein at least a portion of the one or more hat portions is configured to extend away from the surface and the one or more coupling mechanisms so as to receive the one or more thermal insulation sheets there-below.

9. The thermal cover of claim 1, wherein at least a portion of the one or more support straps is configured to extend toward the surface and away from the one or more coupling mechanisms so as to receive the one or more thermal insulation sheets thereon.

10. The thermal cover of claim 1, wherein the one or more components comprise one or more of: a seam; one or more rivets; one or more structural beams; one or more connection bolts.

11. The thermal cover of claim 1, wherein the one or more thermal insulation sheets comprise one or more of: silicon; ceramic; fiberglass.

12. The thermal cover of claim 1, further comprising one or more holes extending through the one or more hat portions, the one or more support straps, and the one or more thermal insulation sheets, wherein the one or more holes are configured to receive one or more vehicle components therethrough.

13. The thermal cover of claim 1, wherein the one or more support straps are arranged in a ladder configuration beneath the thermal insulation sheets to minimize weight and maximize fluid drainage.

14. The thermal cover of claim 1, wherein the hat portion comprises an overhang that extends beyond the one or more coupling assemblies and is suspended above the surface to define a secondary fluid flow path.

15. The thermal cover of claim 1, wherein the one or more coupling assemblies further comprises firewall sealant applied around the threaded bolt and the spacer.

16. A thermal cover for protecting one or more components in an engine bay, comprising:

a hat portion configured to extend across a seam in a floor of the engine bay;

a plurality of support straps disposed beneath the hat portion and suspended above the floor to define a fluid drainage gap wherein the one or more support straps are arranged in a ladder configuration beneath the thermal insulation sheets;

a thermal insulation sheet disposed between the hat portion and the plurality of support straps;

and a coupling assembly comprising a threaded bolt and a spacer configured to secure the hat portion to the floor while maintaining the fluid drainage gap.

17. The thermal cover of claim 16, wherein the support straps are arranged in parallel and spaced at regular intervals along the length of the hat portion.

18. The thermal cover of claim 16, wherein the hat portion includes an overhang extending laterally beyond the support straps.

19. The thermal cover of claim 16, wherein the hat portion comprises a plurality of holes configured to permit fluid flow therethrough.

* * * * *